United States Patent
Lee et al.

(10) Patent No.: US 9,726,942 B2
(45) Date of Patent: Aug. 8, 2017

(54) LIQUID CRYSTAL LENS PANEL

(71) Applicant: SAMSUNG DISPLAY CO., LTD., Yongin, Gyeonggi-Do (KR)

(72) Inventors: Jong Suk Lee, Daegu (KR); Hae Young Yun, Suwon-si (KR); Kyung Ho Jung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 159 days.

(21) Appl. No.: 14/621,288

(22) Filed: Feb. 12, 2015

(65) Prior Publication Data

US 2016/0054626 A1 Feb. 25, 2016

(30) Foreign Application Priority Data

Aug. 22, 2014 (KR) .................. 10-2014-0109589

(51) Int. Cl.
G02F 1/1343 (2006.01)
G02F 1/29 (2006.01)

(52) U.S. Cl.
CPC .......... *G02F 1/134309* (2013.01); *G02F 1/29* (2013.01); *G02F 2001/294* (2013.01)

(58) Field of Classification Search
CPC . G02F 1/134309; G02F 1/29; G02F 2001/294
See application file for complete search history.

(56) References Cited

U.S. PATENT DOCUMENTS

| 7,911,548 | B2 | 3/2011 | Hong et al. |
| 8,305,551 | B2 | 11/2012 | Son |
| 8,358,399 | B2 | 1/2013 | Lee et al. |
| 2009/0153653 | A1* | 6/2009 | Lee .................. G02F 1/13471 348/59 |
| 2012/0236043 | A1 | 9/2012 | Jung et al. |
| 2012/0300042 | A1 | 11/2012 | Yun et al. |
| 2013/0107147 | A1 | 5/2013 | Whangbo et al. |

FOREIGN PATENT DOCUMENTS

| KR | 10-2010-0075301 A | 7/2010 |
| KR | 10-2010-0075302 A | 7/2010 |
| KR | 10-1230318 B1 | 2/2013 |
| KR | 10-2014-0102035 A | 8/2014 |

* cited by examiner

*Primary Examiner* — Donald Raleigh
*Assistant Examiner* — Kevin Quarterman
(74) *Attorney, Agent, or Firm* — Lewis Roca Rothgerber Christie LLP

(57) ABSTRACT

A liquid crystal lens panel including: a lens region in which a plurality of unit liquid crystal lenses are located, each of the plurality of unit liquid crystal lenses including a plurality of electrodes, a peripheral area configured to surround the lens region, a first bus line at the peripheral area and including a first contact region coupled to a first one of the electrodes of the unit liquid crystal, and a second bus line at the peripheral area and in parallel to and separate from the first bus line, the second bus line including a second contact region coupled to a second one of the electrodes of the unit liquid crystal lens, wherein the first contact region protrudes from the first bus line, and the second contact region protrudes from the second bus line in a direction facing the first contact region.

15 Claims, 9 Drawing Sheets

LIQUID CRYSTAL LENS PANEL

CROSS-REFERENCE TO RELATED APPLICATION

This application claims priority to and the benefit of Korean Patent Application No. 10-2014-0109589, filed in the Korean Intellectual Property Office on Aug. 22, 2014, the entire content of which is incorporated herein by reference.

BACKGROUND

1. Field

An aspect of an embodiment of the present invention relates to a liquid crystal lens panel.

2. Description of the Related Art

Recently, with the development of display device technology, the three-dimensional (3D) image display device has received attention and various 3D image display methods have been researched.

In implementing the 3D image display device, one of the generally used methods uses binocular disparity. A method for using binocular disparity allows the same display device to display an image arriving at a left eye and an image arriving at a right eye, and allows each of the two images to be incident on the left and right eyes of an observer. That is, images observed at different angles are input to both eyes, such that an observer may perceive a three-dimensional effect.

In this case, to input the images to each of the left and right eyes of the observer, there are a number of methods including a method of using a barrier, a method of using a lenticular lens, which is a kind of a cylindrical lens, and the like.

The 3D image display device using the barrier forms a slit in the barrier, and divides the image from the display device into a left eye image and a right eye image by using the slit to be input to each of the left eye and the right eye of the observer.

The 3D image display device using the lens displays each of the left eye image and the right eye image, and changes an optical path for the images from the 3D image display device using the lens to divide the images into the left eye image and the right eye image.

In addition, a two-dimensional/three-dimensional image display device for converting a plane image display method into a 3D image display method has been in the limelight. To this end, a switchable lens like a liquid crystal lens has been developed.

The above information disclosed in this Background section is only for enhancement of understanding of the background of the invention and therefore it may contain information that does not form the prior art that is already known in this country to a person of ordinary skill in the art.

SUMMARY

An aspect of an embodiment of the present invention is directed toward a liquid crystal lens panel having a reduction in the width of its peripheral area.

According to aspects of embodiments of the present invention, there is provided a liquid crystal lens panel including: a lens region in which a plurality of unit liquid crystal lenses are located, each of the plurality of unit liquid crystal lenses including a plurality of electrodes; a peripheral area configured to surround the lens region; a first bus line at the peripheral area and including a first contact region coupled to a first one of the electrodes of the unit liquid crystal; and a second bus line at the peripheral area and in parallel to and separate from the first bus line, the second bus line including a second contact region coupled to a second one of the electrodes of the unit liquid crystal lens, wherein the first contact region protrudes from the first bus line, and the second contact region protrudes from the second bus line in a direction facing the first contact region.

In an embodiment, the first contact region and the second contact region do not overlap.

In an embodiment, a width of the first contact region is greater than a width of the first bus line.

In an embodiment, the width of the first contact region is the same as that of the second contact region, and a width of the first bus line is the same as a width of the second bus line.

In an embodiment, the width of the first contact region is in a range of about 10 μm to about 15 μm, and the width of the first bus line is in a range of about 4 μm to about 7 μm.

In an embodiment, the first contact region and the second bus line are separated from each other by about 4 μm to about 7 μm.

In an embodiment, the first bus line and the second bus line are sequentially repeated at the peripheral region.

In an embodiment, the liquid crystal lens panel further includes a third bus line and a fourth bus line between the first bus line and the second bus line and in parallel with the first bus line.

In an embodiment, the third bus line is between the first bus line and the fourth bus line and includes a third contact region coupled to a third one of the electrodes of the unit liquid crystal lens, and the fourth bus line is separate from the second bus line and includes a fourth contact region coupled to a fourth one of the electrodes of the unit liquid crystal lens.

In an embodiment, a width of the third contact region and a width of the fourth contact region are each the same as the width of the first contact region, and the width of the third bus line and the width of the fourth bus line are each the same as the width of the first bus line.

In an embodiment, the third contact region and the fourth contact region do not overlap.

In an embodiment, the third bus line extends from the third contact region in two opposite directions, and the fourth bus line is extends from the third contact region in the two opposite directions.

In an embodiment, the third bus line extends from a laterally lower portion of the third contact region at a first side thereof, and the third bus line extends from a laterally upper portion of the third contact region at a second side thereof.

In an embodiment, the fourth bus line extends from a laterally lower portion of the fourth contact region at a first side thereof, and the fourth bus line extends from a laterally upper portion of the fourth contact region at a second side thereof.

In an embodiment, the first bus line, the third bus line, the fourth bus line, and the second bus line are sequentially repeated at the peripheral region.

Accordingly, example embodiment of the present invention reduce wiring frequency by setting the width of a portion of the connection extending from the unit liquid crystal lens for contacting the bus lines to be different from the width of another portion.

Because the wiring frequency is repeated, a reduction in the length of the wiring frequency, as achieved by example embodiments of the present invention, may result in a significant reduction in the width of the peripheral area that is proportional to the number of repetitions of the wiring frequency.

DETAILED DESCRIPTION

Figure 1:
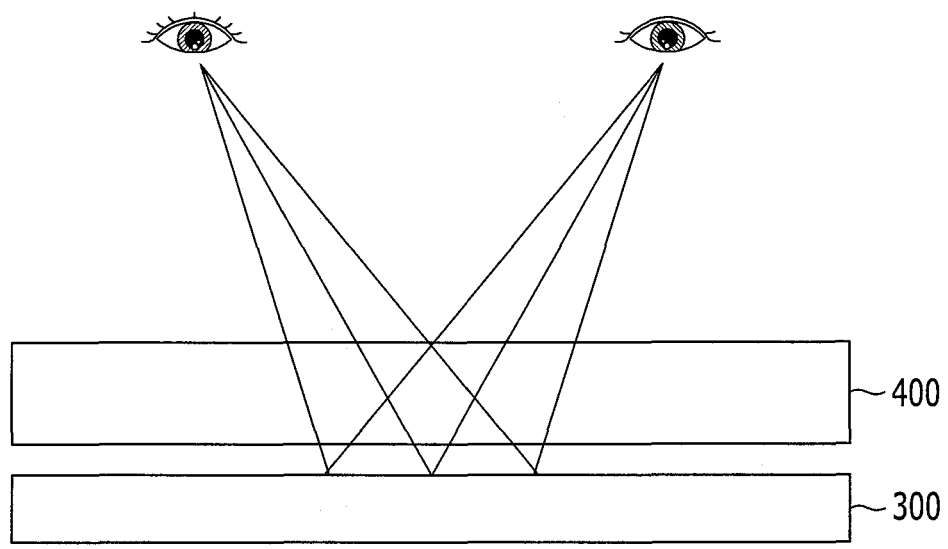
FIG. 1 and FIG. 2 illustrate a schematic structure of a display device including a liquid crystal lens panel and the formations of a 2D image and a 3D image, according to some example embodiments of the present invention.

An example embodiment of the present invention will hereinafter be described in more detail with reference to the accompanying drawings. As those skilled in the art would realize, the described embodiments may be modified in various different ways, all without departing from the spirit or scope of the present invention. The present example embodiments provide a disclosure of the present invention and inform the scope of the present invention to those skilled in the art.

In the drawings, the thickness of layers, films, panels, regions, etc., are exaggerated for clarity. Like reference numerals designate like elements throughout the specification.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "lower", "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

It will be understood that when an element or layer is referred to as being "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
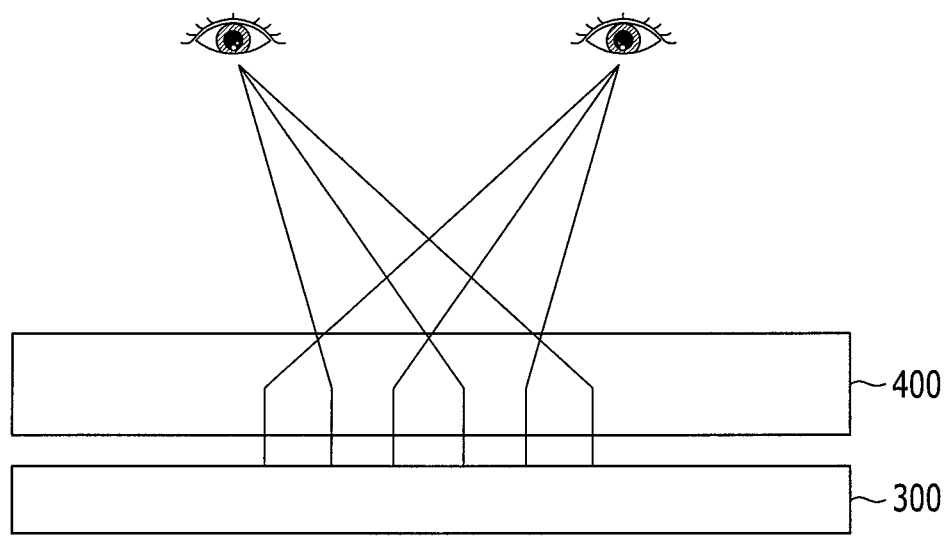

FIG. 1 and FIG. 2 illustrate a schematic structure of a display device including a liquid crystal lens panel and the formations of a 2D image and a 3D image, according to some example embodiments of the present.

The display device includes a display panel 300, which displays an image, and a liquid crystal lens panel 400, which is located in front of a surface (screen) on which an image of the display panel 300 is displayed. The display panel 300 and the liquid crystal lens panel 400 may operate in a two-dimensional mode or a three-dimensional mode. The display panel 300 may be an organic light emitting diode (OLED) display panel or a liquid crystal display (LCD) panel.

The display panel 300 may be a display panel of various suitable flat panel displays, such as a liquid crystal display, an organic light emitting device, a plasma display device, an electrophoretic display, or the like. The display panel 300 includes a plurality of pixels, which may be arranged in a matrix form. The display panel 300 may display one plane image in the two-dimensional mode, or may, alternately, display images corresponding to the different fields of vision, such as a right eye image, a left eye image, and the like, in the three-dimensional mode by a spatial or temporal division method. For example, in the three-dimensional mode, the display panel 300 may alternately display the right eye image and the left eye image in each pixel array.

The liquid crystal lens panel 400 originally transmits the image displayed on the display panel 300 in the two-dimensional mode, and separates the field of vision of the image displayed on the display panel 300 in the three-dimensional mode. For example, the liquid crystal lens panel 400 operating in the three-dimensional mode focuses a multi-view image including the left eye image and the right eye image displayed on the display panel 300 on the fields of vision corresponding to the images at each view by using the diffractive and refractive phenomenon of light.

As illustrated in FIG. 1, when the display panel 300 and the liquid crystal lens panel 400 are operating in the two-dimensional mode, the same image arrives at a left eye and a right eye to perceive the 2D image. As illustrated in FIG. 2, when the display panel 300 and the liquid crystal lens panel 400 are operating in the three-dimensional mode, the liquid crystal lens panel 400 separates and refracts the image of the display panel 300 into each field of vision such as a left eye and a right eye to perceive the 3D image.

Figure 3:
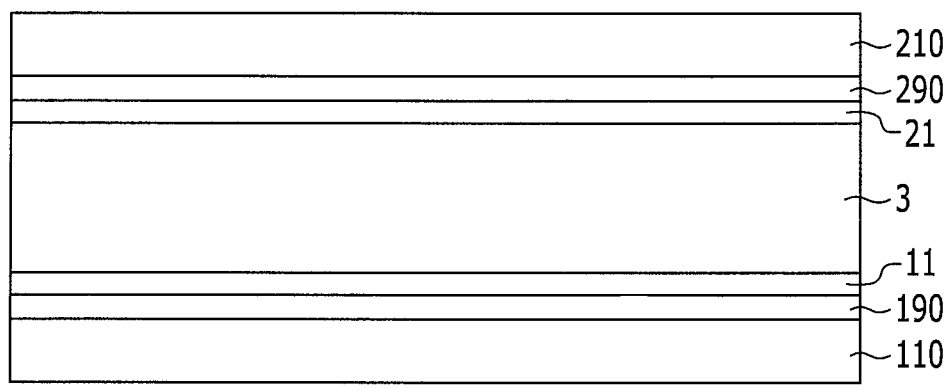
FIG. 3 is a cross-sectional view illustrating a schematic layer structure of a lens region of a liquid crystal lens panel, according to an example embodiment of the present invention.

FIG. 3 is a cross-sectional view illustrating a schematic layer structure of a lens region of the liquid crystal lens panel, according to the example embodiment of the present invention.

Referring to FIG. 3, the liquid crystal lens panel 400 is made of an insulating material such as glass or plastic, and includes a first substrate 110 and a second substrate 210, which face each other, and a liquid crystal layer 3 that is interposed between the two substrates 110 and 210. A polarizer may be provided outside each of the substrates 110 and 210.

A first electrode layer 190 and an alignment layer 11 are sequentially formed on the first substrate 110, and a second electrode layer 290 and an alignment layer 21 are sequentially formed on the second substrate 210.

The first electrode layer 190 and the second electrode layer 290 may include a plurality of electrodes, and may be made of a transparent conductive material such as indium tin oxide (ITO) or indium zinc oxide (IZO). The first electrode layer 190 and the second electrode layer 290 form an electric field in the liquid crystal layer 3, according to the applied voltage, to control an orientation of liquid crystal molecules of the liquid crystal layer 3.

The alignment layers 11 and 21 determine an initial orientation of the liquid crystal molecules of the liquid crystal layer 3 and may determine the orientation of the liquid crystal molecules, such that the liquid crystal molecules may be rapidly oriented depending on the electric field formed in the liquid crystal layer 3.

The liquid crystal layer 3 may be aligned in various suitable modes, such as a horizontal alignment mode, a vertical alignment mode, and a twisted nematic (TN) mode.

The liquid crystal lens panel 400 operates in the two-dimensional mode or the three-dimensional mode depending on the voltage applied to the first electrode layer 190 and the second electrode layer 290. For example, when the voltage is not applied to the first electrode layer 190 and the second electrode layer 290, the liquid crystal lens panel 400 may operate in the two-dimensional mode, and when the voltage is applied to the first electrode layer 190 and the second electrode layer 290, the liquid crystal lens panel 400 may operate in the three-dimensional mode. For this purpose, an initial orientation of liquid crystal molecules 31 and a transmissive axis direction of the polarizer may be properly controlled.

Hereinafter, the liquid crystal lens panel 400 operating in the three-dimensional mode will be described.

The liquid crystal lens panel 400 operating in the three-dimensional mode includes a plurality of unit liquid crystal lenses. The unit liquid crystal lenses may be repeatedly arranged at a period (e.g., predetermined period) in one direction of the liquid crystal lens panel 400. The position of the unit liquid crystal lens within the liquid crystal lens panel 400 may be fixed or may be changed over time.

The single unit liquid crystal lens may be implemented as a Fresnel zone plate. Generally, like a Fresnel zone, the Fresnel zone plate is radially arranged and refers to a device that serves as a lens using the diffractive phenomenon of light instead of the refractive phenomenon of light by using a plurality of concentric circles having an interval, which is narrowed further away from a center.

Figure 4:
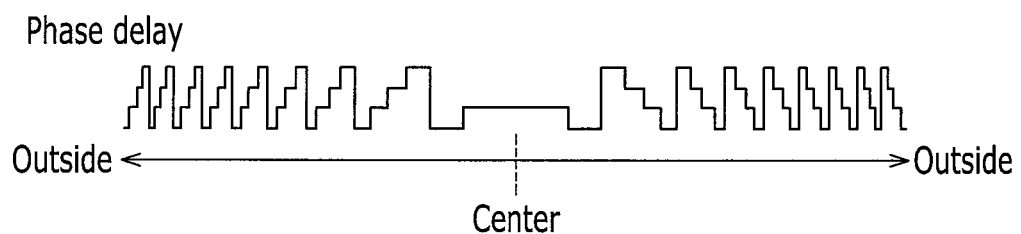
FIG. 4 is a graph illustrating the change in phase delay based on a position of a Fresnel zone plate of a phase modulation type.

FIG. 4 is a graph illustrating the change in phase delay based on a position of a Fresnel zone plate of a phase modulation type (e.g., kind). In this case, each zone of the Fresnel zone plate becomes a region to which each of the waveforms repeated in the graph belongs.

Referring to FIG. 4, a phase delay is changed to a stepped form in each zone. In the zone, which is located at the center, the phase delay is changed over two steps, and in the zone except for the center, the phase delay is changed over four steps. However, this does not limit the number of steps in which the phase delay in each zone is changed.

As in FIG. 4, the Fresnel zone plate for which the phase retardation is changed into the step shape in each zone is referred to as a multi-level phase modulation zone plate. The liquid crystal lens of the liquid crystal lens panel may refract light to allow the light to be collected at a focal point by using diffraction and dissipation of light that is transmitted through each zone, and constructive interference. As described above, a phase delay distribution depending on the Fresnel zone plate is generated for each of the liquid crystal lenses of the liquid crystal lens panel, so that a lens effect may be exhibited.

Figure 5:
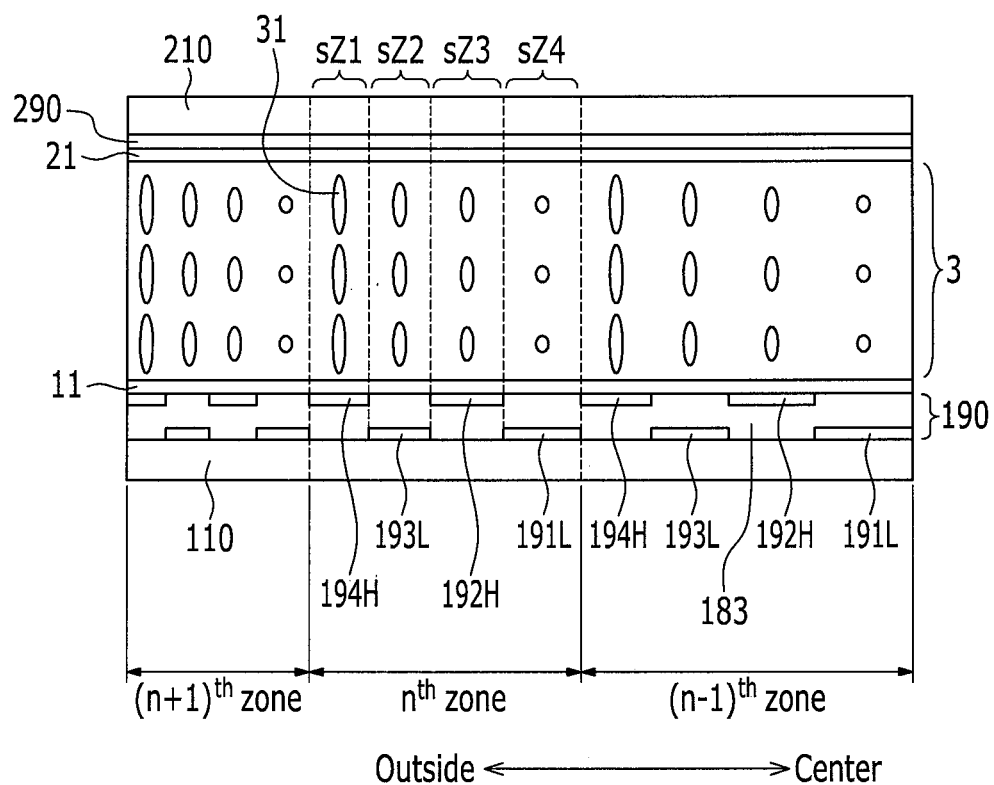
FIG. 5 is a cross-sectional view illustrating a portion of a unit liquid crystal lens in a liquid crystal lens panel, according to an example embodiment of the present invention.

FIG. 5 is a cross-sectional view illustrating a portion of a unit liquid crystal lens in a liquid crystal lens panel according to an example embodiment of the present invention. The same constituent elements as the example embodiment of FIG. 3 are denoted by the same reference numerals, and the description thereof may not be repeated.

Referring to FIG. 5, the liquid crystal lens panel includes the first substrate 110 and the second substrate 210, which face each other, and the liquid crystal layer 3 that is interposed between the two substrates 110 and 210. The first electrode layer 190 and the first alignment layer 11 are sequentially formed on the first substrate 110, and the second electrode layer 290 and the second alignment layer 21 are sequentially formed on the second substrate 210.

The first electrode layer 190 includes the plurality of electrodes, which are arranged in a double layer, having an insulating layer therebetween. For example, the first electrode layer 190 may include a plurality of lower electrodes 191L and 193L and a plurality of upper electrodes 192H and 194H, which are formed on the insulating layer 183 formed on the first electrodes. The lower electrodes 191L and 193L and the upper electrodes 192H and 194H may be alternately positioned with respect to each other in a horizontal direction, and may not overlap each other. FIG. 5 illustrates that edges of the adjacent lower electrodes 191L and 193L and upper electrodes 192H and 194H do not overlap each other; however, some of the edges may slightly overlap each other.

A horizontal direction width of the lower electrodes 191L and 193L and the upper electrodes 192H and 194H, an interval between the lower electrodes 191L and 193L, and an interval between the upper electrodes 192H and 194H are gradually narrowed further away from the center of the unit liquid crystal lens, and are gradually narrowed further away from the center within each zone. In an $(n-1)^{th}$ zone, an $n^{th}$ zone, and an $(n+1)^{th}$ zone, the two lower electrodes 191L and 193L and the two upper electrodes 192H and 194H are located in each zone of the unit liquid crystal lens, and a region in which each of the electrodes 191L, 192H, 193L, and 194H in each zone is located forms one sub-zone sZ4, sZ3, sZ2, and sZ1. In one zone, sub-zones ordered sequentially based on distance from the center may be represented by sZ1, sZ2, sZ3, and sZ4, with sZ1 and sZ4 representing the sub zones respectively furthest away from and closest to the center. FIG. 5 illustrates that a single zone includes four sub-zones sZ1, sZ2, sZ3, and sZ4, however, the number of sub-zones is not limited thereto. Unlike as illustrated in FIG. 5, the horizontal direction width of the lower electrodes 191L and 193L and the upper electrodes 192H and 194H included in one zone may be constant, and the number of electrodes included in each zone may also be reduced toward the outside zone.

The insulating layer 183 electrically insulates the lower electrodes 191L and 193L from the upper electrodes 192H and 194H. The insulating layer 183 may be made of an inorganic insulating material, such as a silicon nitride ($SiN_x$), a silicon oxide ($SiO_x$), or a silicon oxynitride ($Si-O_xN_y$), or may be made of an organic insulating material.

The second electrode layer 290 is formed over the whole surface of the second substrate 210 and is applied with a defined voltage such as common voltage Vcom. The second electrode layer 290 may be made of a transparent conductive material, such as ITO or IZO.

The first and second alignment layers 11 and 21 may be rubbed in a length direction (direction perpendicular to the surface in FIG. 5), which is perpendicular to a width direction of the lower electrodes 191L and 193L and the upper electrodes 192H and 194H or a direction that forms an angle (e.g., a predetermined angle) thereto. The rubbing directions of the alignment layers 11 and 21 may be opposite to each other.

The liquid crystal molecules 31 of the liquid crystal layer 3 may be initially oriented in a direction parallel to the surfaces of the substrates 110 and 210, however, the alignment mode of the liquid crystal layer 3 is not limited thereto and, for example, the liquid crystal molecules 31 may be perpendicularly aligned (e.g., may be perpendicular to the surfaces of the substrates 110 and 210).

Polarity of the voltage applied to the first electrode layer 190 with respect to the common voltage Vcom may be inverted for each zone, in which the inversion is referred to as space inversion. (Hereinafter, polarity of the voltage applied to the first electrode layer with respect to the common voltage is in short referred to as "polarity of the voltage applied to the first electrode layer"). Therefore, directions of electric fields, which are generated in adjacent zones may be opposite to each other. Further, the polarity of the voltage applied to each electrode of the first electrode layer 190 may be inverted at a time (frame) period, in which the inversion is referred to as time inversion.

Figure 6:
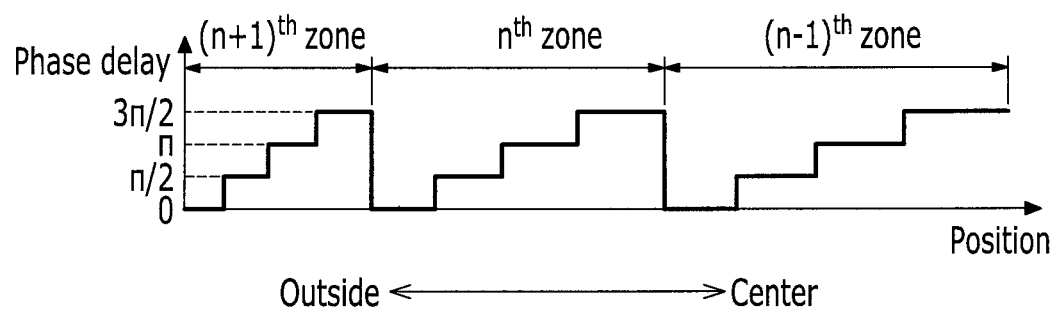
FIG. 6 is a diagram illustrating the change in phase delay based on a position in a unit liquid crystal lens of FIG. 5, according to an example embodiment of the present invention.

FIG. 6 is a diagram illustrating the change in phase delay based on a position in a unit liquid crystal lens of FIG. 5, according to an example embodiment of the present invention. The liquid lens panel is implemented as a phase modulation type (e.g., kind) of Fresnel zone plate for each unit liquid crystal lens.

Referring to FIG. 6, the phase delay in each of the $(n-1)^{th}$ zone, the $n^{th}$ zone, and the $(n+1)^{th}$ zone of the unit liquid crystal lens is changed over four steps. Therefore, the liquid crystal lens panel forms the phase delay distribution depending on the Fresnel zone plate, thereby generating the lens effect. The phase delay in each of the plurality of zones is stepwise increased toward the center from the outside (e.g., within each zone, the phase delay of a sub-zone closer to the center is greater than the phase delay of a sub-zone further away from the center). The same sub-zone in the plurality of zones may generate the same phase delay. In the zone boundary, a slope of the phase delay with respect to the position is, in some examples, substantially vertical.

Figure 7:
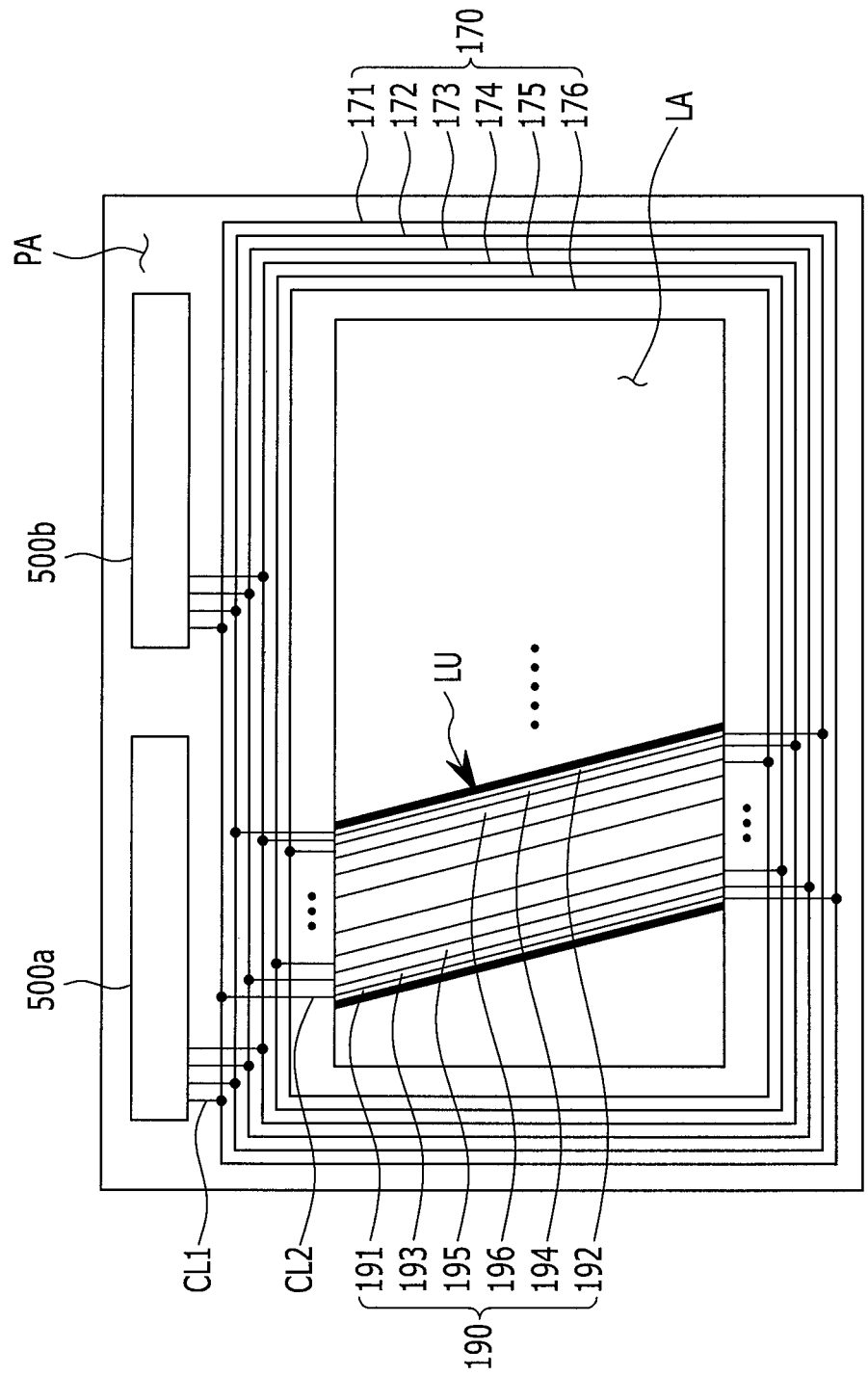
FIG. 7 is a plan view of a liquid crystal lens panel, according to an example embodiment of the present invention.

FIG. 7 is a plan view of a liquid crystal lens panel according to an example embodiment of the present invention. The same constituent elements as those illustrated in the previous drawings are denoted by the same reference numerals, and the same description thereof may not be repeated.

Referring to FIG. 7, the liquid crystal lens panel includes a lens region LA and a peripheral area PA surrounding the lens region LA.

A plurality of unit liquid crystal lenses LUs are located in the lens region LA. Each of the unit liquid crystal lenses LU includes first to sixth electrodes 191 to 196 that extend in parallel with each other, which are included as the electrodes of the first electrode layer 190 of the liquid crystal lens panel. These electrodes 191 to 196 of the first electrode layer 190 may be formed to be inclined at an angle (e.g., a predetermined angle) to reduce (e.g., prevent) a moiré phenomenon. To simplify the following description and to avoid overly complicating the drawings, a total of six electrodes 191 to 196, i.e., three electrodes 191, 193, and 195 at a left side of the first electrode layer 190 of the unit liquid crystal lens LU and three electrodes 192, 194, and 196 at a right side thereof, are illustrated. However, according to another example embodiment of the present invention, the number of the electrodes of the first electrode layer 190 may be in the tens to hundreds.

A driving unit for driving the unit liquid crystal lens LU within the lens region LA may be located in the peripheral area PA. The driving unit may include at least one of driving circuits 500a and 500b. Generally, as a size of the liquid crystal lens panel is increased, the number of driving circuits is increased. The drawings illustrate that the driving circuits 500a and 500b are located over the liquid crystal lens panel, however, according to some example embodiments, the driving circuits 500a and 500b may be located at at least one of the upper, lower, left, and right sides.

A bus line layer 170 including a plurality of bus lines is also located in the peripheral area PA. The driving circuits 500a and 500b are electrically coupled (e.g., electrically coupled) to the bus lines of the bus line layer 170. The bus lines include first to sixth bus lines 171 to 176, which are electrically coupled to the respective electrodes 191 to 196 of the first electrode layer 190 to apply an output voltage from the driving circuits 500a and 500b to the first to sixth electrodes 191 to 196 through the first to sixth bus lines 171 to 176. To avoid complication of the drawings, only the six bus lines 171 to 176 are illustrated; however, the bus line layer 170 may include any suitable number of bus lines, which substantially corresponds to the number of electrodes of the first electrode layer 190 of the unit liquid crystal lens LU. According to an example embodiment of the present invention, the number of the bus lines may be tens to hundreds.

The first to sixth bus lines 171 to 176 are located separately from each other at intervals (e.g., predetermined intervals) and are substantially parallel with the adjacent bus lines. The first to sixth bus lines 171 to 176 may extend to surround the lens region LA. For example, the first to sixth bus lines 171 to 176 may have a substantially rectangular shape as illustrated. However, according to an example embodiment of the present invention, the first to sixth bus lines 171 to 176 may extend to surround only a portion of the lens region LA (for example, upper side and/or right side), and may be disconnected at a specific portion, and therefore, may not be continuous.

The first to sixth bus lines 171 to 176 may be electrically coupled to the driving circuits 500a and 500b through a first connection line CL1, and may be electrically coupled to the first to sixth electrodes 191 to 196 of the unit liquid crystal lens LU through a second connection line CL2.

The first to sixth bus lines 171 to 176 may be made of a metal such as titanium (Ti), copper (Cu), molybdenum (Mo), aluminum (Al), or tungsten (W), or a material including the same. The first to sixth bus lines 171 to 176 may be formed of a single layer or a double layer (for example, Ti/Cu). The first connection line CL1 may be made of the same material as the first to sixth bus lines 171 to 176, or may be made of the same material as the electrodes 191, 192, 193, and 194 of the unit liquid crystal lens LU. The second connection line CL2 is formed to extend from the first to sixth electrodes 191 to 196. That is, ends of the first to sixth electrodes 191 to 196 may extend from the lens region LA to be electrically coupled to the first to sixth bus lines 171 to 176.

A first electrode includes the first electrode 191 at a left side of the unit liquid crystal lens LU, which is coupled to the first bus line 171 that is immediately adjacent to the driving circuits 500a and 500b, and the second electrode at a right side of the unit liquid crystal lens LU, which is coupled to the second bus line 172 that is immediately adjacent to the first bus line 171 in a direction of the lens region LA. A second electrode includes the third electrode 191 at the left side of the unit liquid crystal lens LU, which is coupled to the third bus line 173 that is immediately adjacent to the second bus line 172 in the direction of the lens region LA, and the fourth electrode at the right side of the unit liquid crystal lens LU, which is coupled to the fourth bus line 174 that is immediately adjacent to the third bus line 173 in the direction of the lens region LA. As such, the electrodes at the left side and the right side of the unit liquid crystal lens LU are alternately coupled to the corresponding bus lines.

Each of the first to sixth bus lines 171 to 176 may receive voltages having different levels from the driving circuits 500a and 500b. Ends of the first to sixth electrodes 191 to 196 of the unit liquid crystal lens LU may be electrically coupled to each of the first to sixth bus lines 171 to 176, to receive the voltages having different levels. Also, first ends of the first to sixth electrodes 191 to 196 of the unit liquid crystal lens LU may be coupled to the same bus lines as the bus lines to which second ends of the first to sixth electrodes 191 to 196 are coupled (e.g., connected). In this case, the same voltage may be applied between the opposite ends of the first to sixth electrodes 191 to 196 to reduce a voltage drop, which is particularly useful in the case of a large liquid crystal lens panel.

The peripheral area of the contact portion of the bus line with the extension of the electrode of the liquid crystal lens will be described in more detail with reference to FIG. 8.

Figure 8:
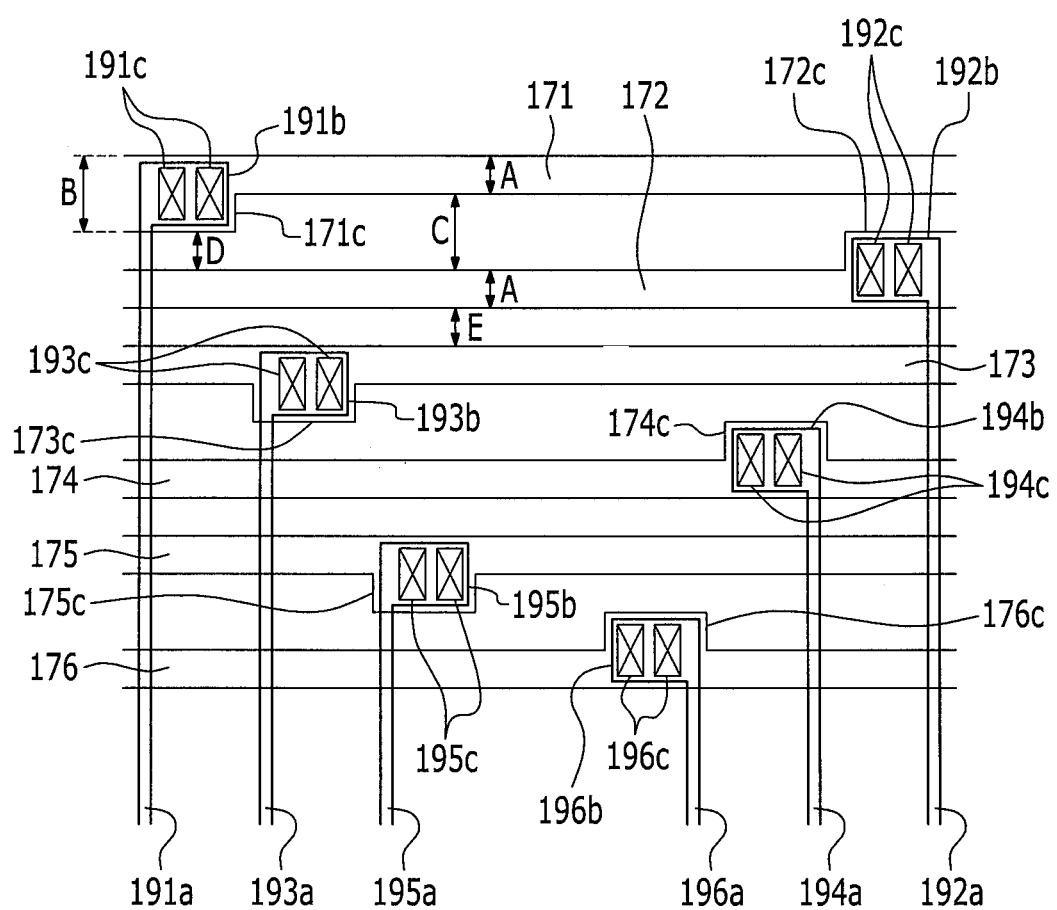
FIG. 8 is an enlarged view illustrating a peripheral area of a contact portion of a bus line with an extension of an electrode of a unit liquid crystal lens in the liquid crystal lens panel of FIG. 7.

FIG. 8 is an enlarged view illustrating a peripheral area of a contact portion of a bus line with an extension of an electrode of a unit liquid crystal lens in the liquid crystal lens panel of FIG. 7.

Referring to FIG. 8, the bus line includes the first bus line 171, the second bus line 172, the third bus line 173, the fourth bus line 174, the fifth bus line 175, and the sixth bus line 176. Each of the bus lines 171 to 176 may be located at the first substrate 110.

The first bus line 171 is located adjacent to the driving circuits 500a and 500b, and the second bus line 172, the third bus line 173, the fourth bus line 174, the fifth bus line 175, and the sixth bus line 176 are sequentially located in the lens region LA with respect to the first bus line 171.

The aforementioned second connection line CL2 includes a first electrode extension 191a, a second electrode extension 192a, a third electrode extension 193a, a fourth electrode extension 194a, a fifth electrode extension 195a, and a sixth electrode extension 196a. The extensions 191a, 192a, 193a, 194a, 195a, and 196a are coupled to the first to sixth electrodes 191 to 196 of the unit liquid crystal lens LU. The first bus line 171, the second bus line 172, the third bus line 173, the fourth bus line 174, the fifth bus line 175, and the sixth bus line 176 are respectively coupled to the first to sixth electrodes 191 to 196 through the first electrode extension 191a, the second electrode extension 192a, the third electrode extension 193a, the fourth electrode extension 194a, the fifth electrode extension 195a, and the sixth electrode extension 196a.

The first electrode extension 191a, the second electrode extension 192a, the third electrode extension 193a, the fourth electrode extension 194a, the fifth electrode extension 195a, and the sixth electrode extension 196a respectively include a first electrode contact portion 191b, a second electrode contact portion 192b, a third electrode contact portion 193b, a fourth electrode contact portion 194b, a fifth electrode contact portion 195b, and a sixth electrode contact portion 196b, which respectively contact the first bus line 171, the second bus line 172, the third bus line 173, the fourth bus line 174, the fifth bus line 175, and the sixth bus line 176. The first bus line 171, the second bus line 172, the third bus line 173, the fourth bus line 174, the fifth bus line 175, and the sixth bus line 176 respectively include a first contact region 171c, a second contact region 172c, a third contact region 173c, a fourth contact region 174c, a fifth contact region 175c, and a sixth contact region 176c, which respectively contact the first electrode contact portion 191b, the second electrode contact portion 192b, the third electrode contact portion 193b, the fourth electrode contact portion 194b, the fifth electrode contact portion 195b, and the sixth electrode contact portion 196b. The first electrode contact portion 191b, the second electrode contact portion 192b, the third electrode contact portion 193b, the fourth electrode contact portion 194b, the fifth electrode contact portion 195b, and the sixth electrode contact portion 196b are respectively brought into contact with the first contact region 171c, the second contact region 172c, the third contact region 173c, the fourth contact region 174c, the fifth contact region 175c, and the sixth contact region 176c through contact holes 191c to 196c. Each of the contact holes 191c to 196c may include a plurality of corresponding contact holes. In the present example embodiment, each of the contact holes 191c to 196c may include two corresponding contact holes. This is to reduce the resistance and the width of a contact portion.

Herein, the first contact region 171c, the second contact region 172c, the third contact region 173c, the fourth contact region 174c, the fifth contact region 175c, and the sixth contact region 176c are respectively protruded from the first bus line 171, the second bus line 172, the third bus line 173, the fourth bus line 174, the fifth bus line 175, and the sixth bus line 176. Accordingly, a first length (e.g., first width) A as the width of the first bus line 171, the second bus line 172, the third bus line 173, the fourth bus line 174, the fifth bus line 175, and the sixth bus line 176 is smaller than a second length (e.g., second width) B as the width of the first contact region 171c, the second contact region 172c, the third contact region 173c, the fourth contact region 174c, the fifth contact region 175c, and the sixth contact region 176c.

Also, in the case of the first bus line 171 and the second bus line 172, which are overlapped with each other, the first contact region 171c and the second contact region 172c are arranged to protrude in such a direction so as to face each other without being overlapped with each other. Accordingly, the first bus line 171 and the second bus line 172 are separated from each other by a third length (e.g., third distance or gap) C, and the first contact region 171c and the second bus line 172 are separated from each other by a fourth length (e.g., fourth distance or gap) D.

The third bus line 173 that is located to be adjacent to the second bus line 172 is separated therefrom by a fifth length E, and the third contact region 173c is located to protrude from the third bus line 173 in a direction that is opposite to the direction in which the second contact region 172c is protruded. The fourth contact region 174c is located to protrude from the fourth bus line 174 that is adjacent to the third bus line 173 in a direction that faces the third contact region 173c without being overlapped therewith. The fifth contact region 175c is located to protrude from the fifth bus line 175 that is adjacent to the fourth bus line 174 in a direction that is opposite to the direction in which the fourth contact region 174c is protruded. The sixth contact region 176c is located to protrude from the sixth bus line 176 that is adjacent to the fifth bus line 175 in a direction that faces the fifth contact region 175c without being overlapped therewith.

As such, for the structure in which the bus lines 171 to 176 are located, two contact regions that are protruded in the direction in which they face each other without being overlapped with each other are repeated. For example, the first contact region 171c and the second contact region 172c, the third contact region 173c and the fourth contact region 174c, and the fifth contact region 175c and the sixth contact region 176c are protruded in the direction in which they face each other without being overlapped with each other are repeated. Herein, a pattern in which the two contact regions are repeated is referred to as a wiring frequency.

Also, in view of widths and intervals of the respective bus lines 171 to 176 that are located at the peripheral area, the second length B, the fourth length D, the first length A, and the fifth length E are repeatedly located in the direction of the lens region LA from the driving circuit 500a and 500b. Accordingly, the length of one wiring frequency is obtained by summing the second length B, the fourth length D, the first length A, and the fifth length E.

Hereinafter, lengths will be described in more detail.

In some examples, the width of a region for bringing the bus line into contact with a connection extended from the electrode of the unit liquid crystal lens is in a range of about 10 μm to about 15 μm, and the distance between the bus lines is in a range of about 4 μm to about 7 μm.

In the present example embodiment, the second length B is in a range of about 10 μm to about 15 μm, and the fifth length E is in a range of about 4 μm to about 7 μm. Further, the fourth length D indicating a distance between the first contact region 171c and the second bus line 172, i.e., the distance between the bus lines, is the same as the fifth length E. In addition, in the present example embodiment, the first length A is not the same as, and is smaller than, the second length B, and is in a range of about 4 μm to about 7 μm. The third length C is in a range of about 10 μm to about 15 μm between the first contact region 171c and the second contact region 172c, which are protruded.

In the present example embodiment, one wiring frequency constitutes two bus lines. In a related art liquid crystal lens panel having one wiring frequency, the length of the wiring frequency is in a range of about 28 μm to about 44 μm. However, in the present example embodiment, the length of one wiring frequency is in a range of about 22 μm to about 36 μm.

In other words, when one wiring frequency of the liquid crystal lens panel, according to the present example embodiment, is compared with that of the related art liquid crystal lens panel, the length of one wiring frequency of the liquid crystal lens panel according to the present example embodiment is reduced by about 6 μm to about 8 μm.

Accordingly, as in the present example embodiment, it is possible to reduce a wiring frequency (e.g., reduce the length of a wiring frequency) by differently setting the width of a portion of the connection extending from the unit liquid crystal lens for contacting the bus lines and the width of another portion.

Because the wiring frequency is repeated, a reduction in the length of the wiring frequency, as achieved by example embodiments of the present invention, may result in a reduction in the width of the peripheral area that is proportional to the number of repetitions of the wiring frequency.

Hereinafter, a liquid crystal lens panel according to an example embodiment of the present invention will be described with reference to FIG. 9 and FIG. 10.

Figure 9:
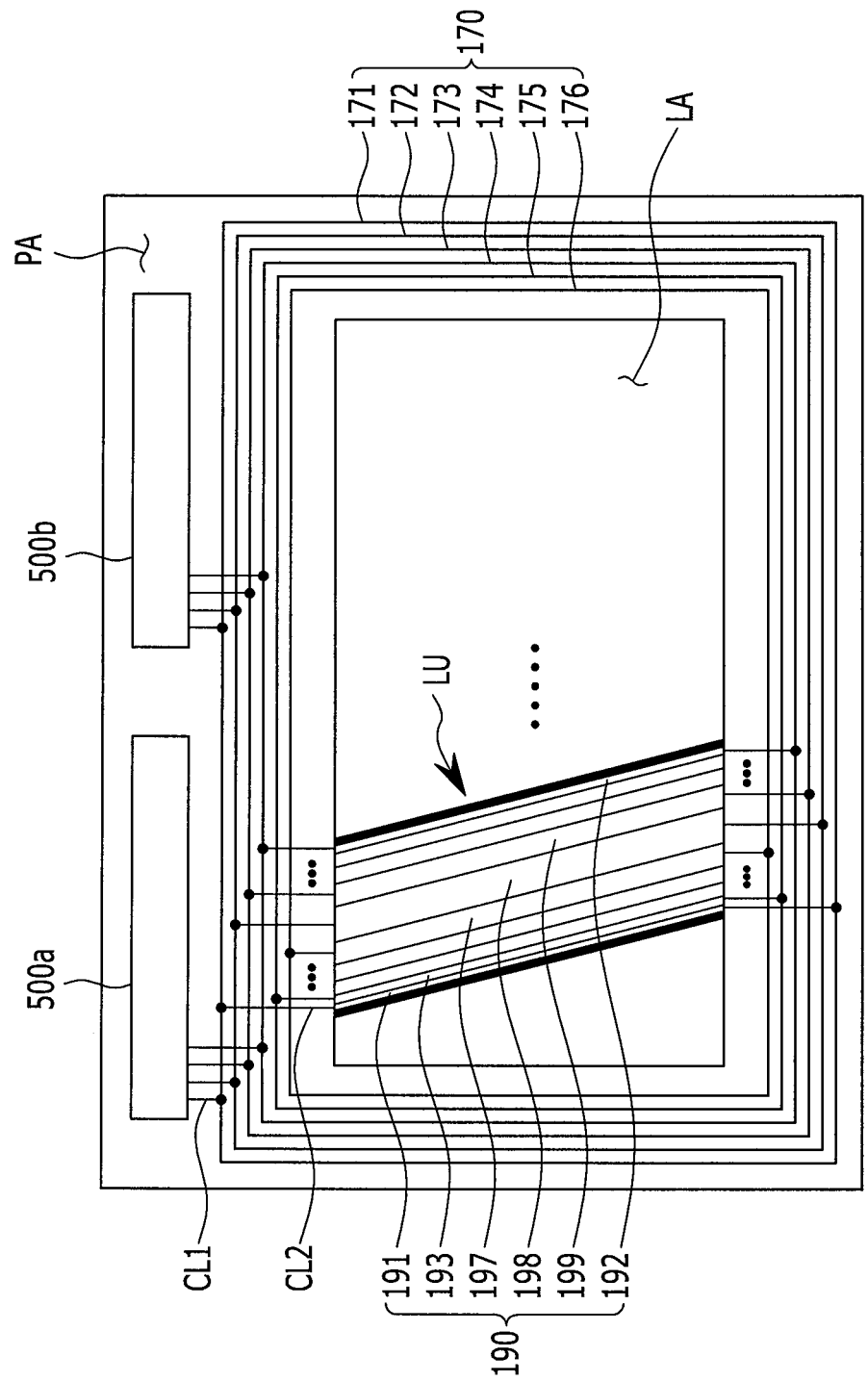
FIG. 9 is a top plan view of a liquid crystal lens panel, according to an example embodiment of the present invention.

FIG. 9 is a top plan view of a liquid crystal lens panel, according to an example embodiment of the present invention. FIG. 10 is an enlarged view illustrating a peripheral area of a contact portion of a bus line with an extension of an electrode of a unit liquid crystal lens in the liquid crystal lens panel of FIG. 9.

Figure 10:
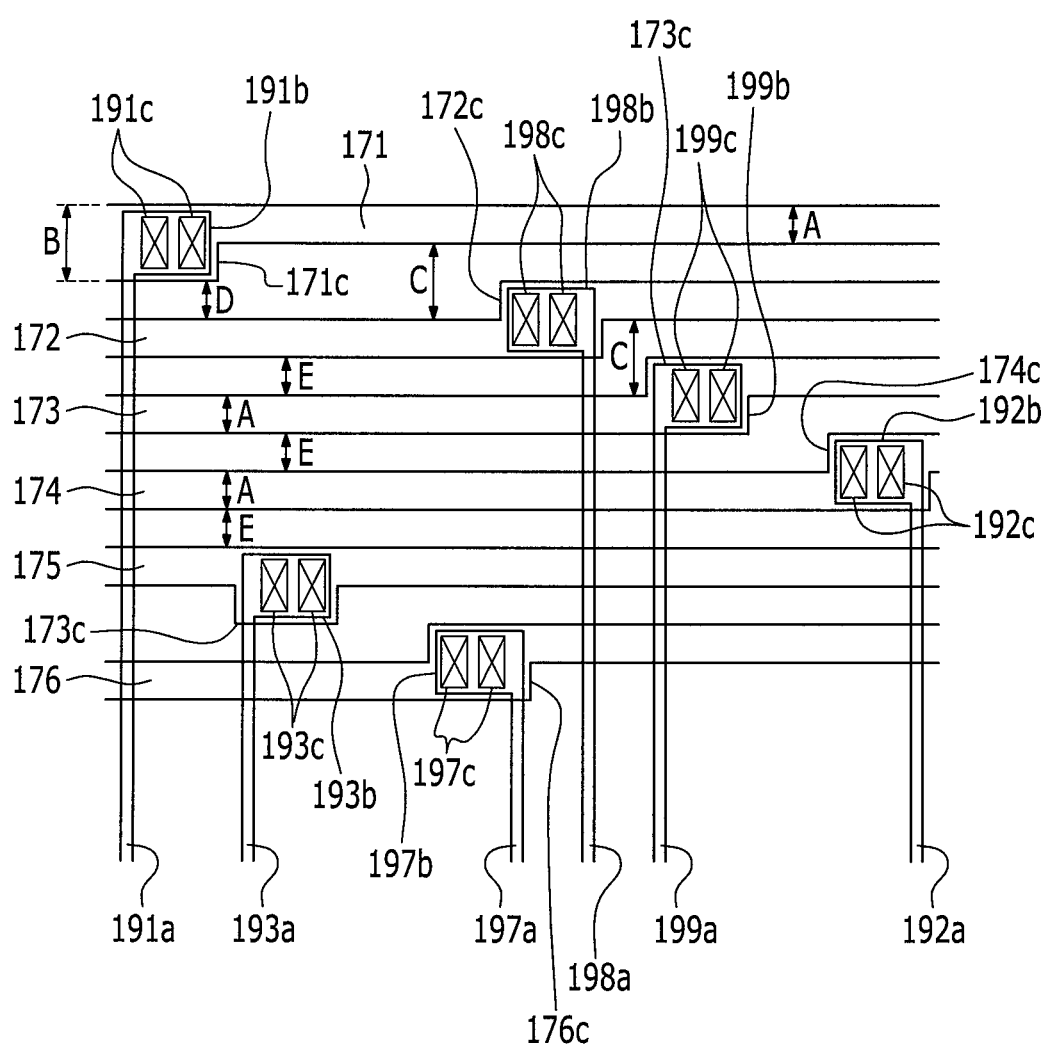
FIG. 10 is an enlarged view illustrating a peripheral area of a contact portion of a bus line with an extension of an electrode of a unit liquid crystal lens in the liquid crystal lens panel of FIG. 9.

Referring to FIGS. 9 and 10, the structure of the liquid crystal lens panel according to the present example embodiment is the same as that of the liquid crystal lens panel according to the example embodiment of FIG. 8, except for the electrodes of the unit liquid crystal lens LU and the connection of bus lines. Accordingly, the description of the same elements may not be repeated here.

A first electrode, i.e., the first electrode 191 at a left side of the unit liquid crystal lens LU, is coupled to (e.g., connected to) the first bus line 171 that is immediately adjacent to the driving circuits 500a and 500b, and a first electrode, i.e., the second electrode 192 at a right side of the unit liquid crystal lens LU is coupled to the fourth bus line 174.

The fourth bus line 174 is a bus line that is thirdly adjacent to (e.g., adjacent to and the second bus line away from) the first bus line 171 in the direction of the lens region LA.

A seventh electrode 198 that is located at the center among the electrodes of the unit liquid crystal lens LU is coupled to the second bus line 172 that is immediately adjacent to the first bus line 171 in the direction of the lens region LA, and an eighth electrode 199 that is immediately rightwardly adjacent to (e.g., adjacent to and to right of) the seventh electrode 198 is coupled to the third bus line 173 that is immediately adjacent to the second bus line 172 in the direction of the lens region LA.

A second electrode, i.e., the third electrode 193 at the left surface of the unit liquid crystal lens LU, is coupled to the fifth bus line 175 that is immediately adjacent to the fourth bus line 174 in the direction of the lens region LA, and a ninth electrode 197 that is immediately leftwardly adjacent to (e.g., adjacent to and to left of) the seventh electrode 198.

In this connection structure, a first leftward electrode of the unit liquid crystal lens LU, a central electrode thereof, a first rightward electrode of the central electrode, and a first rightward electrode of the unit liquid crystal lens LU are respectively coupled to the bus lines that are sequentially located from the first bus line 171 in the direction of the lens region LA, and successively coupled to a secondly leftward electrode of the unit liquid crystal lens LU, a first leftward electrode of the central electrode, a secondly rightward electrode of the central electrode, and a secondly rightward electrode of the unit liquid crystal lens LU. In this way, the four bus lines are coupled to left and right electrodes of the unit liquid crystal lens LU and left and right electrodes of the center thereof.

The second connection line CL2 further includes a seventh electrode extension 198a, an eighth electrode extension 199a, and a ninth electrode extension 197a. The extensions 198a, 199a, and 197a are respectively coupled to the seventh to ninth electrodes 198, 199, and 197 of the unit liquid crystal lens LU.

The first bus line 171, the second bus line 172, the third bus line 173, the fourth bus line 174, the fifth bus line 175, and the sixth bus line 176 are respectively coupled to the first electrode 191, the seventh electrode 198, the eighth electrode 199, the second electrode 192, the third electrode 193, and the ninth electrode 197 of the unit liquid crystal lens LU through the first electrode extension 191a, the seventh electrode extension 198a, the eighth electrode extension 199a, the second electrode extension 192a, the third electrode extension 193a, and the ninth electrode extension 197a, respectively.

The first electrode extension 191a, the seventh electrode extension 198a, the eighth electrode extension 199a, the second electrode extension 192a, the third electrode extension 193a, and the ninth electrode extension 197a respectively include a first electrode contact portion 191b, a seventh electrode contact portion 198b, an eighth electrode contact portion 199b, a second electrode contact portion 192b, a third electrode contact portion 193b, and a ninth electrode contact portion 197b, which respectively contact the first bus line 171, the second bus line 172, the third bus line 173, the fourth bus line 174, the fifth bus line 175, and the sixth bus line 176. The first bus line 171, the second bus line 172, the third bus line 173, the fourth bus line 174, the fifth bus line 175, and the sixth bus line 176 respectively include a first contact region 171c, a second contact region 172c, a third contact region 173c, a fourth contact region 174c, a fifth contact region 175c, and a sixth contact region 176c, which respectively contact the first electrode contact portion 191b, the seventh electrode contact portion 198b, the eighth electrode contact portion 199b, the second electrode contact portion 192b, the third electrode contact portion 193b, and the ninth electrode contact portion 197b. The first electrode contact portion 191b, the seventh electrode contact portion 198b, the eighth electrode contact portion 199b, the second electrode contact portion 192b, the third electrode contact portion 193b, and the ninth electrode contact portion 197b respectively contact the first contact region 171c, the second contact region 172c, the third contact region 173c, the fourth contact region 174c, the fifth contact region 175c, and the sixth contact region 176c through the contact holes 191c, 198c, 199c, 192c, 193c and 197c. Each of the contact holes 191c, 198c, 199c, 192c, 193c and 197c may include a plurality of corresponding contact holes. In the present example embodiment, each of the contact holes 191c to 197c may include two corresponding contact holes. This is to reduce the resistance and the width of a contact portion.

A first length (e.g., first width) A as the width of the first bus line 171, the second bus line 172, the third bus line 173, the fourth bus line 174, the fifth bus line 175, and the sixth bus line 176 is smaller than a second length (e.g., second width) B as the width of the first contact region 171c, the second contact region 172c, the third contact region 173c, the fourth contact region 174c, the fifth contact region 175c, and the sixth contact region 176c.

Herein, the first contact region 171c and the fourth contact region 174c are respectively protruded from the first bus line 171 and the fourth bus line 174. The first contact region 171c and the fourth contact region 174c are not overlapped with each other, and their protruding directions face each other.

The second bus line 172 extends from the second contact region 172c in opposite directions including a first direction (e.g., a leftward direction) and a second direction (e.g., a rightward direction). In an example, the second bus line 172 is leftwardly and rightwardly extended from the second contact region 172c. A leftwardly extending portion thereof is extended from a laterally lower portion of the second contact region 172c, and a rightwardly extending portion thereof is extended from a laterally upper portion of the second contact region 172c.

The third bus line 173 extends from the third contact region 173c in opposite directions including the first direction (e.g., the leftward direction) and the second direction (e.g., the rightward direction). In an example, the third bus line 173 is leftwardly and rightwardly extended from the third contact region 173c. A leftwardly extending portion thereof is extended from a laterally lower portion of the third contact region 173c, and a rightwardly extending portion thereof is extended from a laterally upper portion of the third contact region 173c. Herein, the second contact region 172c and the third contact region 173c do not overlap (e.g., are not overlapped with each other).

The fifth contact region 175c is protruded in a direction that is opposite to the direction in which the fourth contact region 174c is protruded. The sixth bus line 176 is leftwardly and rightwardly extended from the sixth contact region 176c. A leftwardly extending portion thereof is extended from a laterally lower portion of the sixth contact region 176c, and a rightwardly extending portion thereof is extended from a laterally upper portion of the sixth contact region 176c.

Although not shown, a seventh bus line and an eighth bus line are sequentially located in the direction of the lens region LA from the sixth bus line 176. The seventh bus line and the eighth bus line respectively include the seventh contact region and the eighth contact region. The seventh bus line is leftwardly and rightwardly extended from the seventh contact region. A leftwardly extending portion thereof is extended from a laterally lower portion of the seventh contact region, and a rightwardly extending portion thereof is extended from a laterally upper portion of the seventh contact region The eighth contact region is protruded from the eighth bus line in such a direction so as to face the fifth contact region 175c without being overlapped therewith. In addition, the sixth contact region 176c and the seventh contact region are not overlapped with each other.

As such, a pattern of four bus lines is repeated. For the four bus lines, e.g., the first to fourth bus lines 171, 172, 173, and 174, the first contact region 171c and the fourth contact region 174c are not overlapped with each other, and their protruding directions face each other. The second contact region 172c and the third contact region 173c, which are not overlapped with each other, are located between the first bus line 171 and the fourth bus line 174.

As a result, two first contact regions that are protruded in such a direction so as to face each other without being overlapped with each other and two second contact regions that are not overlapped with each other and are located between the two first contact regions are repeated. Herein, a pattern in which the four contact regions are repeated is referred to as a wiring frequency.

The first bus line 171 and the second bus line 172 are separated from each other by a third length (e.g., third separation or gap) C, and the first contact region 171c and the second bus line 172 are separated from each other by a fourth length (e.g., fourth separation or gap) D. The second bus line 172 and the third bus line 173, the third bus line 173 and the fourth bus line 174, and the fourth bus line 174 and the fifth bus line 175 are separated from each other by a fifth length E.

In view of widths and intervals of the respective bus lines 171 to 176 that are located at the peripheral area, the second length B, the fourth length D, the first length A, the fifth length E, the first length A, the fifth length E, the first length A, and the fifth length E are repeatedly located in the direction of the lens region LA from the driving circuits 500a and 500b. Accordingly, the length of one wiring frequency is obtained by summing the second length B, the fourth length D, the first length A, the fifth length E, the first length A, the fifth length E, the first length A, and the fifth length E.

Hereinafter, these lengths will be described in more detail.

In general, the width of a region for bring the bus line into contact with a connection extended from the electrode of the unit liquid crystal lens is in a range of about 10 µm to about 15 µm, and the distance between the bus lines is in a range of about 4 µm to about 7 µm.

In the present example embodiment, the second length B is in a range of about 10 µm to about 15 µm, and the fifth length E is in a range of about 4 µm to about 7 µm. Further, the fourth length D indicating a distance between the first contact region 171c and the second bus line 172, i.e., the distance between the bus lines is the same as the fifth length E. In addition, in the present example embodiment, the first length A is not the same as, and is smaller than, the second length B, and is in a range of about 4 µm to about 7 µm. The third length C is in a range of about 10 µm to about 15 µm between the first contact region 171c and the second contact region 172c, which are protruded.

In the present example embodiment, one wiring frequency constitutes four bus lines. In a related art liquid crystal lens panel having one wiring frequency, the length of the wiring frequency is in a range of about 56 µm to about 88 µm. However, in the present example embodiment, the length of one wiring frequency is in a range of about 38 µm to about 64 µm.

In other words, when one wiring frequency of the liquid crystal lens panel, according to the present example embodiment, is compared with that of the related art liquid crystal lens panel, one wiring frequency of the liquid crystal lens panel according to the present example embodiment is reduced by about 18 µm to about 24 µm.

Accordingly, as in the present example embodiment, it is possible to reduce a wiring frequency (e.g., reduce the length of a wiring frequency) by differently setting the width of a portion of the connection extending from the unit liquid crystal lens for contacting the bus lines and the width of another portion.

Because the wiring frequency is repeated, a reduction in the length of the wiring frequency, as achieved by example embodiments of the present invention, may result in a reduction in the width of the peripheral area that is proportional to the number of repetitions of the wiring frequency. Also, when the wiring frequency of the liquid crystal lens panel according to the example embodiment of FIG. 8 is compared with the wiring frequency of the liquid crystal lens panel according to the example embodiment of FIG. 10, two bus lines constitute one wiring frequency in the liquid crystal lens panel according to the example embodiment of FIG. 8, while four bus lines constitute one wiring frequency in the liquid crystal lens panel according to the example embodiment of FIG. 10.

As described above, one wiring frequency of the liquid crystal lens panel according to the example embodiment of FIG. 8 is reduced by about 6 µm to about 8 µm as compared with the related art liquid crystal lens panel. Further, one wiring frequency of the liquid crystal lens panel according to the example embodiment of FIG. 10 is reduced by about 18 µm to about 24 µm as compared with the related art liquid crystal lens panel.

As a result, as the number of the bus lines constituting one wiring frequency is increased, the width of one wiring frequency is reduced. Accordingly, as the number of the bus lines constituting one wiring frequency is increased, the width of the peripheral area is reduced.

Further, the structure in which two or four bus lines constitute one wiring frequency has been described. However, the number of the bus lines constituting one wiring frequency may be greater than four without being limited thereto. In this case, the number of the bus lines constituting one wiring frequency may be increased within a range in which a contact region of one bus line is not overlapped with a contact region of another bus line.

While this invention has been described in connection with what is presently considered to be practical example embodiments, it is to be understood that the invention is not limited to the disclosed embodiments, but, on the contrary, is intended to cover various suitable modifications and equivalent arrangements included within the spirit and scope of the appended claims and equivalents thereof.

What is claimed is:

1. A liquid crystal lens panel comprising:
   a lens region in which a plurality of unit liquid crystal lenses are located, each of the plurality of unit liquid crystal lenses comprising a plurality of electrodes;
   a peripheral area configured to surround the lens region;
   a first bus line at the peripheral area and comprising a first contact region coupled to a first one of the electrodes of the unit liquid crystal; and
   a second bus line at the peripheral area and in parallel to and separate from the first bus line, the second bus line comprising a second contact region coupled to a second one of the electrodes of the unit liquid crystal lens, wherein the first contact region protrudes from the first bus line, and the second contact region protrudes from the second bus line in a direction facing the first contact region.

2. The liquid crystal lens panel of claim 1, wherein the first contact region and the second contact region do not overlap.

3. The liquid crystal lens panel of claim 2, wherein a width of the first contact region is greater than a width of the first bus line.

4. The liquid crystal lens panel of claim 3, wherein the width of the first contact region is the same as that of the second contact region, and
a width of the first bus line is the same as a width of the second bus line.

5. A liquid crystal lens panel comprising:
a lens region in which a plurality of unit liquid crystal lenses are located, each of the plurality of unit liquid crystal lenses comprising a plurality of electrodes;
a peripheral area configured to surround the lens region;
a first bus line at the peripheral area and comprising a first contact region coupled to a first one of the electrodes of the unit liquid crystal; and
a second bus line at the peripheral area and in parallel to and separate from the first bus line, the second bus line comprising a second contact region coupled to a second one of the electrodes of the unit liquid crystal lens,
wherein the first contact region protrudes from the first bus line, and the second contact region protrudes from the second bus line in a direction facing the first contact region,
wherein the first contact region and the second contact region do not overlap,
wherein a width of the first contact region is greater than a width of the first bus line,
wherein the width of the first contact region is the same as that of the second contact region,
wherein a width of the first bus line is the same as a width of the second bus line, and
wherein the width of the first contact region is in a range of about 10 μm to about 15 μm, and the width of the first bus line is in a range of about 4 μm to about 7 μm.

6. The liquid crystal lens panel of claim 5, wherein the first contact region and the second bus line are separated from each other by about 4 μm to about 7 μm.

7. The liquid crystal lens panel of claim 6, wherein the first bus line and the second bus line are sequentially repeated at the peripheral area.

8. The liquid crystal lens panel of claim 5, further comprising a third bus line and a fourth bus line between the first bus line and the second bus line and in parallel with the first bus line.

9. The liquid crystal lens panel of claim 8, wherein the third bus line is between the first bus line and the fourth bus line and comprises a third contact region coupled to a third one of the electrodes of the unit liquid crystal lens, and
the fourth bus line is separate from the second bus line and comprises a fourth contact region coupled to a fourth one of the electrodes of the unit liquid crystal lens.

10. The liquid crystal lens panel of claim 9, wherein a width of the third contact region and a width of the fourth contact region are each the same as the width of the first contact region, and
the width of the third bus line and the width of the fourth bus line are each the same as the width of the first bus line.

11. The liquid crystal lens panel of claim 10, wherein the third contact region and the fourth contact region do not overlap.

12. The liquid crystal lens panel of claim 11, wherein the third bus line extends from the third contact region in two opposite directions, and
the fourth bus line is extends from the third contact region in the two opposite directions.

13. The liquid crystal lens panel of claim 12, wherein the third bus line extends from a laterally lower portion of the third contact region at a first side thereof, and
the third bus line extends from a laterally upper portion of the third contact region at a second side thereof.

14. The liquid crystal lens panel of claim 13, wherein the fourth bus line extends from a laterally lower portion of the fourth contact region at a first side thereof, and
the fourth bus line extends from a laterally upper portion of the fourth contact region at a second side thereof.

15. The liquid crystal lens panel of claim 14, wherein the first bus line, the third bus line, the fourth bus line, and the second bus line are sequentially repeated at the peripheral area.

* * * * *